J. S. CORBIN.
Gate.

No. 221,033. Patented Oct. 28, 1879.

WITNESSES:
A. Schehl.
C. Sedgwick.

INVENTOR:
J. S. Corbin
BY Munn & Co
ATTORNEYS.

UNITED STATES PATENT OFFICE.

JUDSON S. CORBIN, OF CLINTON, IOWA.

IMPROVEMENT IN GATES.

Specification forming part of Letters Patent No. 221,033, dated October 28, 1879; application filed April 5, 1879.

*To all whom it may concern:*

Be it known that I, JUDSON S. CORBIN, of Clinton, in the county of Clinton and State of Iowa, have invented a new and useful Improvement in Gates, of which the following is a specification.

Figure 1:
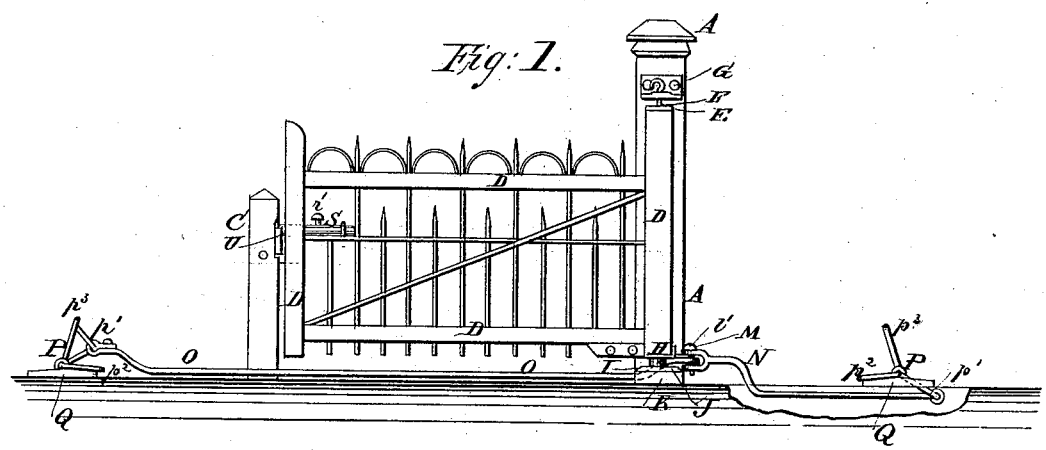
Figure 2:
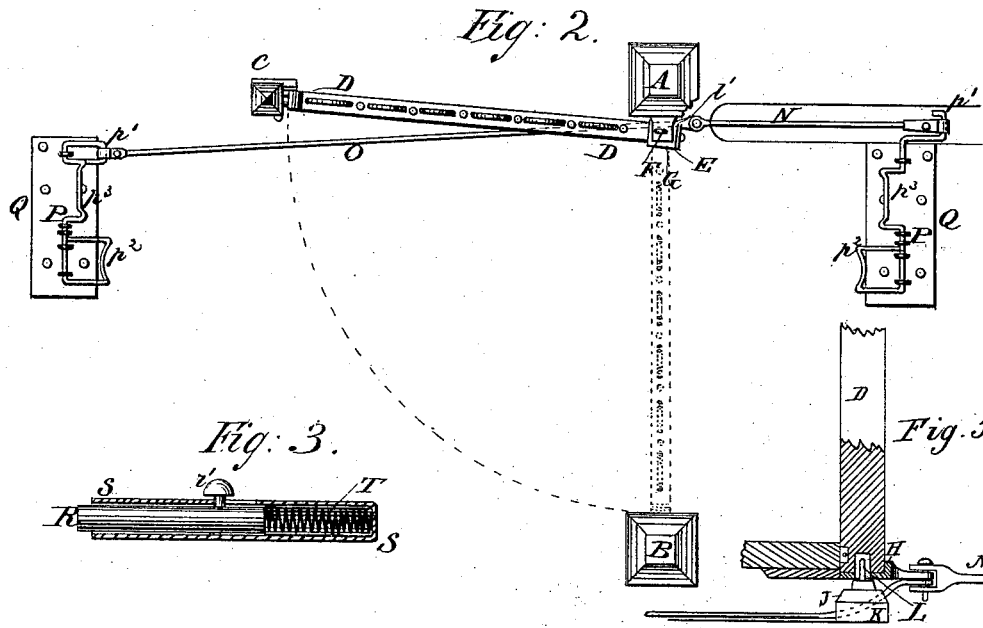
Figure 3:
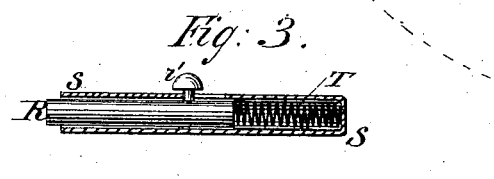
Figure 5:
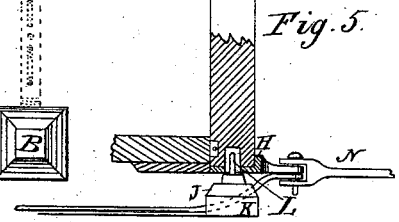
Figure 4:
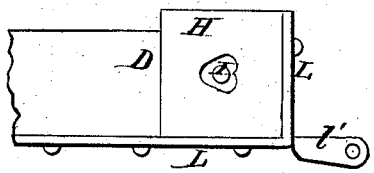

Figure 1 is a side view of my improved gate, shown as fastened open. Fig. 2 is a top view of the same. Fig. 3 is a detail sectional view of the fastening-bolt. Fig. 4 is a bottom view of the rear corner of the gate. Fig. 5 is a vertical section through slotted plate and connections.

Similar letters of reference indicate corresponding parts.

The object of this invention is to furnish an improved gate which shall be so constructed that the gate may be opened and closed by the wheels of passing carriages, and which shall be simple in construction, convenient in use, reliable in operation, and not liable to be obstructed or get out of order.

The invention consists in the peculiarly-constructed opening-irons, and in combining an angle-bar having a single arm with the lower end of the rear end bar of the gate and the inner ends of the connecting-rods, as hereinafter described.

A represents the rear hinge-post, B the front latch-post, and C the side latch-post of the gate D.

To the upper end of the rear end bar of the gate D is attached a beveled cap-plate, E, which has a hole formed through it to receive the pin F. The pin F also passes through a hole in the plate G, the end of which is bent upward, and is bolted to the rear post, A. The beveled cap-plate E, the pin F, and the angle-plate G thus form the upper hinge of the gate.

To the lower end of the rear end bar of the gate D is attached a plate, H, having a heart-shaped hole formed through it to receive the pin I, attached to the beveled cap-plate J. The cap-plate J is attached to the upper end of a low post, K, which is set in the ground at the forward side of the rear post, A, and which is held firmly in place by timbers attached to it beneath the surface of the ground, and some of which are attached to the lower part of the rear post, A.

The pin I is made with a shoulder, upon which the plate H rests, while the end of the said pin enters the heart-shaped hole in the said plate H.

To the lower end of the rear end bar of the gate D is attached a right-angled bar, L, which is made with an arm, $l'$, projecting from its angle. The arm $l'$ has a hole formed through its outer end to receive the pin M, by which it is pivoted to the inner ends of the rods N O. The end of the rod N has a slot formed in it of such a width as to receive the ends of the rod O and arm $l'$, so that the ends of the said rods N O may be supported by the arm $l'$. The outer ends of the rods N O are flattened, are bent into loops around the end cranks, $p'$, of the crank or opening-irons P, and are secured by bolts, rivets, or wires. One of the cranks $p'$ projects downward, and the other upward.

The opening or crank irons P have two cranks, $p^2 p^3$, formed upon them, and inclining from each other, so that when one of the said cranks or bows rests upon the ground, the other may stand in an inclined or oblique position, as shown in Fig. 1. The opening-irons P are hinged by staples or eyebolts to the inclined upper sides of the blocks Q, set in the ground. The opening-irons P, between the inclined cranks or bows $p^2 p^3$, are lengthened to receive the said staples or eyebolts, and the ends of the said irons, except at the downwardly-inclined crank $p'$, are returned and welded or otherwise secured to the bodies of the said irons, as shown in Fig. 2. The bows or bars of the cranks $p^2 p^3$ are concaved, as shown in Fig. 2, so that the vehicle-wheels will not slip off should they strike obliquely.

The connecting-rods N O are bent so that they may be beneath the surface of the ground, except at their inner ends and at the outer end of the rod O, so that they will not be in the way of vehicles that may be moving about the gateway.

The gate D is secured to the front post, B, when closed, and to the side post, C, when opened by the bolt R, which passes through a hole in the front end bar of the said gate, and works in a socket, S, secured to the said gate.

The bolt R is held forward by a coiled spring,

T, placed between its inner end and the inner end of the socket S, as shown in Fig. 3. The movement of the bolt R is limited by a pin or screw, $r'$, which passes through a slot in the said socket S and enters the said bolt R. The bolt R fastens the gate D shut and open by engaging with the catches U, attached to the posts B C. The forward sides of the catches U are beveled, so that they may push back the bolt R automatically as the gate swings into place, and in or above their upper edges are formed notches to allow the end of the bolt R to pass out when the forward end of the gate D is slightly raised in opening and closing it.

With this construction, as the vehicle approaches the gate the driver guides his team so that a wheel may strike the crank $p^3$ of the opening-iron P upon that side of the gate, and press it down, which unfastens the gate, swings it open, and fastens it. As the vehicle passes through the gateway the driver so guides his team that a wheel may strike the crank $p^2$ of the other opening-iron and press it down, which unfastens the gate, swings it shut, and fastens it, the connecting-rods N O being made of such a length that the team and vehicle will always be out of the way of the gate as it swings open and shut. The inclination of the cranks $p^2$ $p^3$ and the peculiar construction of the lower hinge of the gate prevent any sudden jar or shock from coming upon the gate, and cause it to swing open and shut gently and smoothly. Rubber or wire springs are attached to the posts to receive the gate as it opens or shuts.

Having thus described my invention, I claim as new and desire to secure by Letters Patent—

1. The opening-irons P of a gate, having concaved crank-arm, with lengthened section between the cranks, and with the ends of the irons returned and secured to their bodies, substantially as herein shown and described.

2. The combination of plate H, having a heart-shaped hole, the post K, and the angle-bar L, provided with the single arm $l'$, with the lower end bar of the gate D and the inner ends of the connecting-rods N O, substantially as herein shown and described.

JUDSON S. CORBIN.

Witnesses:
CHAS. A. SMITH,
F. THORNBURG.